June 9, 1931.  K. HAUSSMANN  1,809,481
CAM SHAFT DRIVE FOR INTERNAL COMBUSTION ENGINES
Filed June 17, 1929
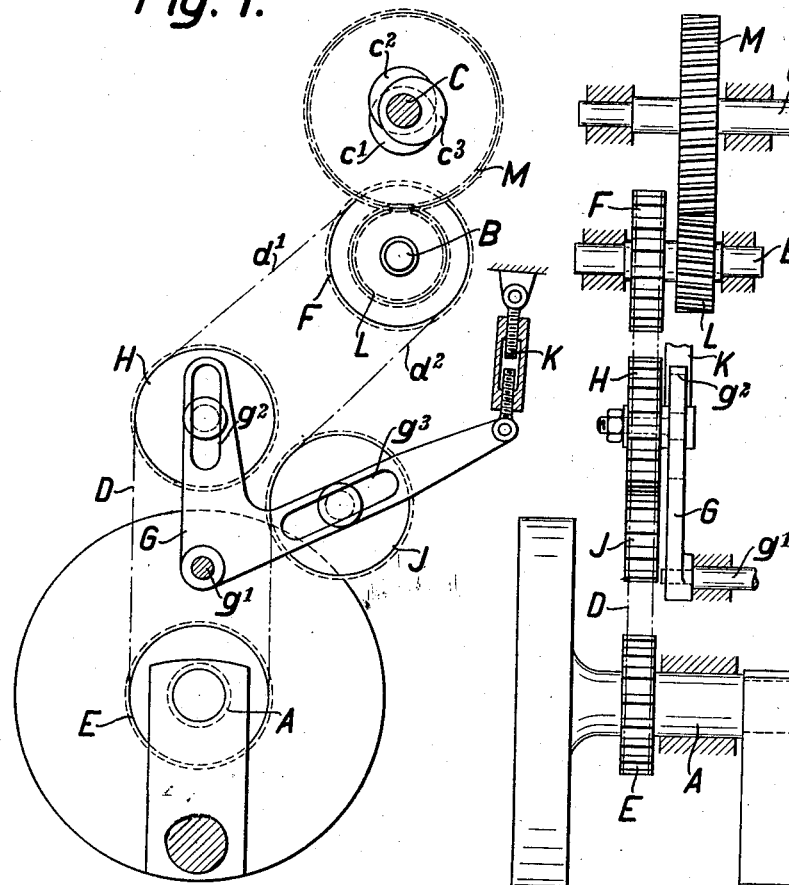
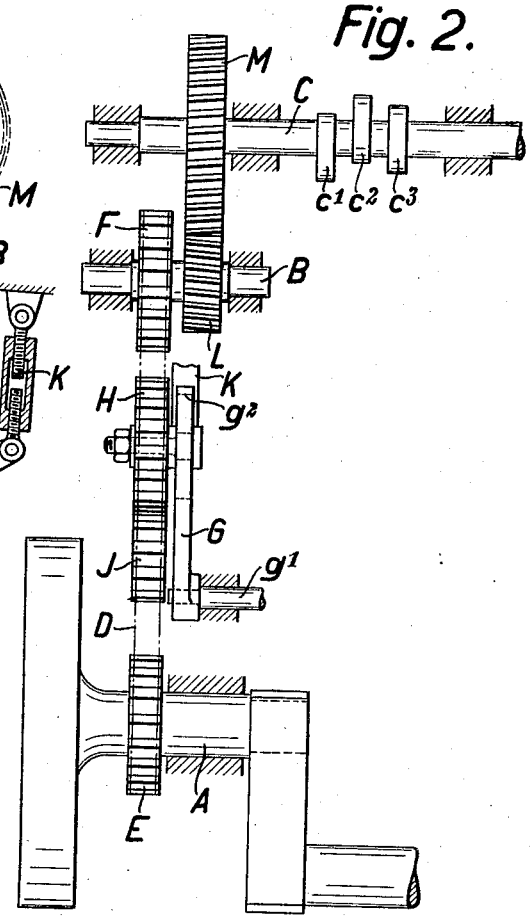
Inventor
Karl Haussmann
By Knight Bros
attorneys.

Patented June 9, 1931

1,809,481

UNITED STATES PATENT OFFICE

KARL HAUSSMANN, OF KIEL, GERMANY, ASSIGNOR TO FRIED. KRUPP GERMANIA-WERFT AKTIENGESELLSCHAFT, OF KIEL-GAARDEN, GERMANY

CAM SHAFT DRIVE FOR INTERNAL COMBUSTION ENGINES

Application filed June 17, 1929, Serial No. 371,588, and in Germany June 20, 1928.

This invention relates to a drive for the controlling shaft of internal combustion engines in which a chain drive adapted to be tightened is provided to transmit the turning moment.

It is known to provide in a drive of this type a tightening device to eliminate the lost motion arising due to the chain stretching.

This tightening device however has been provided hitherto only for one of the two sides of the driving chain, which arrangement suffers from the drawback of an angular displacement of the controlling shaft relatively to the crank shaft taking place in tightening the chain so that the controlling periods are no longer in accordance with the run of the engine.

The invention therefore has for its object to overcome this drawback that is to avoid disturbances in the controlling operation which object is obtained by the fact that both sides of the driving chain are tightened by individual tightening means.

An embodiment of the invention is illustrated by way of example in the accompanying drawings in which Figure 1 is a view, seen in the direction of the crank shaft, of the improved chain drive, and Figure 2 the corresponding side view.

Referring to these drawings, A denotes the crank shaft of the machine and B a counter shaft. C is the cam shaft that carries the cams $c^1$, $c^2$, $c^3$ for the valves. The counter shaft B is driven by an endless chain D running over the two sprocket wheels E and F. On a pin $g^1$ is swingingly mounted a two-armed link G in the slots $g^2$ $g^3$ of which are mounted and can be fixed in position tightening wheels H and J, respectively. By tightening screw K which acts upon the longer arm of link G both sides $d^1$ and $d^2$ of the driving chain D are tightened by the wheels H and J. By suitably adjusting the distances of the wheels H and J from the fulcrum $g^1$ of link G it is possible to so tighten uniformly the chain sides $d^1$ and $d^2$ by tightening screw K that an angular displacement of cam shaft C relatively to crank shaft A does not take place by tightening the chain.

Owing to the tightening wheels H and J being shiftably mounted in the slots $g^2$ and $g^3$ of the arms of link G it is possible also to intentionally displace angularly the cam shaft relatively to the crank shaft in every direction of rotation, to adjust the former.

The counter shaft B has splined on it a gear wheel L and the cam shaft a gear wheel M, these two wheels being in mesh with one another and gearing down the rate of revolutions of the crank shaft. This arrangement next to the cam shaft of the counter shaft affords the advantage that it is the reducing gear train L M which is driven by the chain D. It is already known to arrange the reducing gear train next to the crank shaft so that, inversely as illustrated, it is the chain which is driven by the gear train. This known arrangement, however, suffers from the drawback that a much stronger chain must be employed, since by the arrangement of the gear train next to the crank shaft the tensile stress acting upon the cam shaft is twice that acting upon this shaft with the arrangement illustrated.

What I claim and desire to secure by Letters Patent is:—

1. In an internal combustion engine a crank shaft, a controlling shaft, an endless chain drive inserted between said controlling shaft and the crank shaft, a tightening wheel for each side of said chain drive, a fulcrum, a swing member pivoted on said fulcrum and having mounted on it said two tightening wheels, and means for varying the distance existing between said wheels and said fulcrum.

2. In an internal combustion engine a crank shaft, a controlling shaft, an endless chain drive inserted between said controlling shaft and the crank shaft, a reduction gear inserted between said chain drive and said controlling shaft, and a means for tightening said chain on each side of said chain drive.

3. In an internal combustion engine a crank shaft, a controlling shaft, an endless chain drive inserted between said controlling shaft and the crank shaft, a reduction gear inserted between said chain drive and said controlling shaft, a tightening wheel for each side of said chain drive, a fulcrum, a swing member pivoted on said fulcrum and having mounted on it said two tightening wheels, and means for varying the distance existing between said wheels and said fulcrum.

4. In an internal combustion engine, a crank shaft, a controlling shaft, a chain drive inserted between said controlling shaft and said crank shaft, a tightening member for each side of said chain drive, means for simultaneously moving said tightening members to tighten each side of said chain drive, and means for definitely adjusting the distance one of said tightening members moves with respect to the distance the other of said tightening members moves whereby the angular relation between said crank shaft and said controlling shaft is adjusted.

The foregoing specification signed at Hamburg, Germany, this 5th day of June, 1929.

KARL HAUSSMANN.